March 30, 1954  E. V. BRISCOE  2,673,409
ADJUSTABLE WING UNIT FOR DITCHER BLADES
Filed June 24, 1950
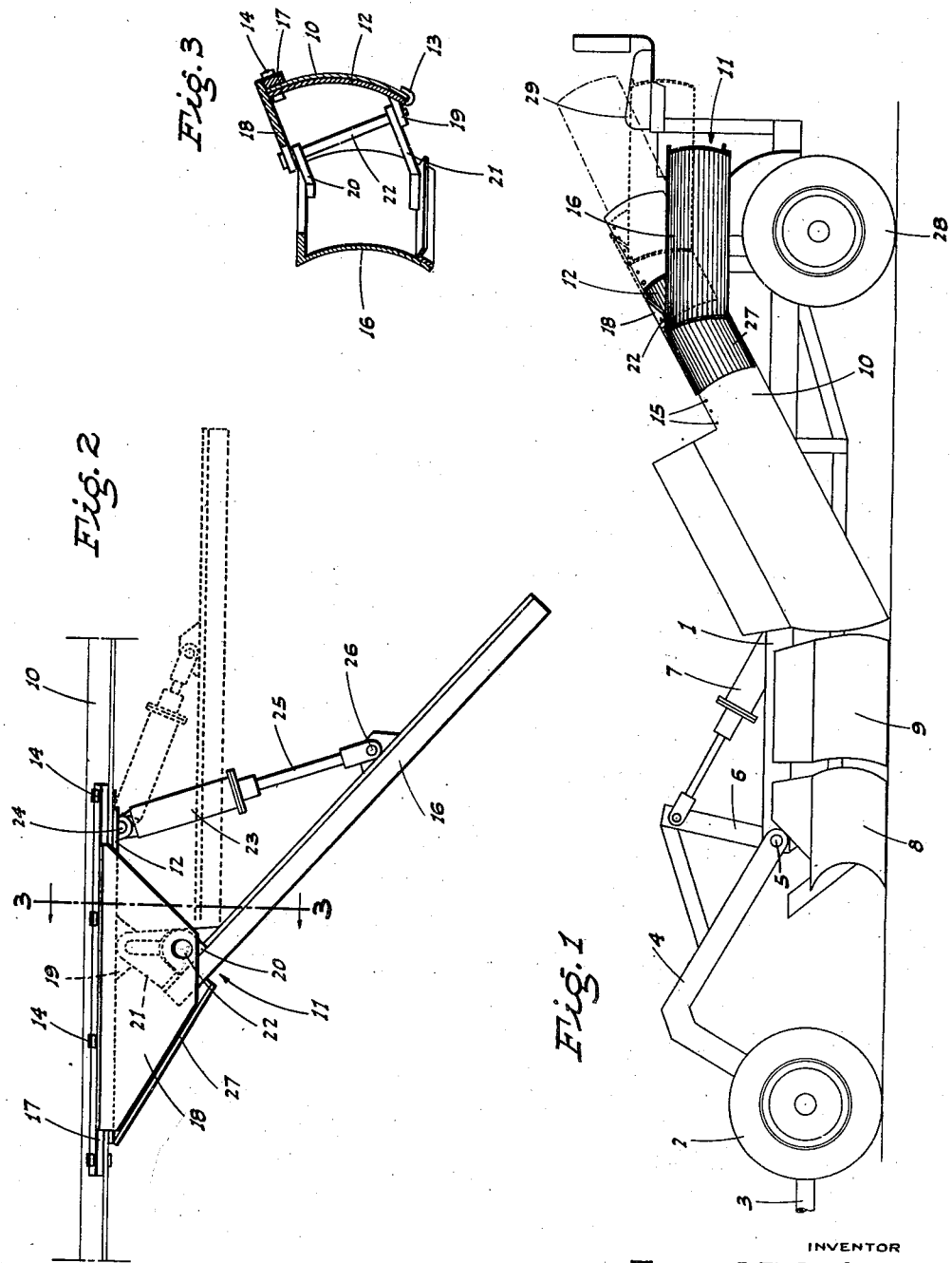
INVENTOR
Ernest V. Briscoe
ATTORNEYS Patented Mar. 30, 1954

2,673,409

UNITED STATES PATENT OFFICE 2,673,409

ADJUSTABLE WING UNIT FOR DITCHER BLADES

Ernest V. Briscoe, Kerman, Calif.

Application June 24, 1950, Serial No. 170,183

2 Claims. (Cl. 37—155)

This invention relates in general to an improvement especially adapted, but not limited, for use in connection with a ditch digging or cleaning implement having upwardly and rearwardly divergent main scraper blades which work the opposite sides of the ditch as the implement advances therein.

As such main scraper blades work the sides of the ditch, the scraped earth, weeds, and debris is caused to move upwardly and rearwardly to deposit on top of the corresponding ditch bank.

It is a major object of this invention to provide each main scraper blade with a wing unit including a supplementary scraper blade adapted to project laterally outwardly from the main scraper blade in position to work along the top of the adjacent bank to spread and smooth the earth and other material which said main scraper blade deposits thereon. This prevents undesirable ridging or windrowing of the spoil on top of the ditch banks.

Another important object of the invention is to provide a power actuated mechanism for adjusting the supplementary scraper blade of each wing unit so that it may be set to the angle of projection as working conditions may require, or swung back to a transport position substantially parallel to the corresponding main scraper blade.

A further object of the invention is to provide a wing unit, for the purpose described, which is arranged for adjustment lengthwise of the corresponding main scraper blade; the position of adjustment being dependent on the depth of the ditch in which the implement is working.

It is also an object of the invention to provide a wing unit designed for ready and economical manufacture; convenience of installation and adjustment; and heavy-duty use.

Still another object of the invention is to provide a practical and reliable adjustable wing unit for ditcher blades, and one which will be exceedingly effective for the purpose for which it is designed.

These objects are accomplished by means of such structure and relative arrangement of parts as will fully appear by a perusual of the following specification and claims.

In the drawings:

Fig. 1 is a side elevation, somewhat diagrammatic, of a ditch digging or cleaning implement; the adjustable wing unit being shown on the adjacent main scraper blade and as set for use.

Fig. 2 is an enlarged fragmentary plan view of said adjustable wing unit; said unit being shown in working position in full lines and in transport position in dotted lines.

Fig. 3 is a transverse section on line 3—3 of Fig. 2.

Referring now more particularly to the characters of reference on the drawings, the invention is here shown as embodied in connection with a ditch digging or cleaning implement of the type which includes a longitudinal main frame 1 supported, at the front end, by a front wheel truck 2 having a forwardly projecting tongue 3 adapted to connect the implement to a tractor in draft relation.

The front wheel truck 2 is connected to the front end of the main frame 1 by means of a gooseneck 4 pivoted, as at 5, to the main frame 1.

A post structure 6 upstands from the pivot of the gooseneck 4 and is adapted to be swung to and fro by a power cylinder 7, whereby to cause relative articulation between the forward portion of the main frame 1 and gooseneck 4 so that selective vertical adjustment of said frame may be attained.

A lister plow 8 is fixed in connection with the main frame 1 at the forward end thereof, and transversely spaced extension blades 9 are supported from said frame rearwardly of corresponding ends of the lister plow 8; the extension blades 9 serving to deliver earth from the lister plow 8 rearwardly onto the lower ends of corresponding main scraper blades 10.

The main scraper blades 10 are suitably supported from the main frame 1 and are disposed on opposite sides of said frame, extending from adjacent the bottom of the ditch in upwardly and rearwardly diverging relation.

The main scraper blades 10 are of substantial length, and when the implement is in operation these blades serve to work along in engagement with opposite sides of the ditch; the earth as scraped from the bottom of the ditch by the lister plow 8 and extension blades 9 feeding onto the main scraper blades 10, and thence flowing upwardly along the latter—together with the earth scraped by said blades 10—to deliver or deposit on top of the corresponding ditch bank.

Unless some means be provided, the earth, weeds, and derbris which is thus deposited on top of the ditch banks would form an undesirable and unsightly ridge or windrow thereon. It is therefore the prime purpose of this invention to provide a novel wing unit for each main scraper blade 10 operative to level and smooth the material deposited, as above, on top of each ditch bank.

Each wing unit is indicated at 11, and comprises the following:

A longitudinal mounting plate 12, which matches the curvature of the corresponding main scraper blade 10, is affixed to the face of the latter, and for adjustment therealong, by a longitudinal hook or channel 13 which engages the lower edge of said blade 10. At its upper edge the mounting plate 12 is secured to the main scraper blade 10 by a plurality of cross bolts 14 which extend through corresponding holes 15, of which there is a row in said blade 10. The mounting plate 12 is adjusted up or down the main scraper blade 10 (see the full line and dotted line positions in Fig. 1), depending on the depth of the ditch in which the implement is working.

The numeral 16 indicates a supplementary scraper blade adapted to project laterally outwardly to work in a substantially horizontal position along the top of the adjacent ditch bank, as shown in full lines in Fig. 2, or to be swung or folded back to a position substantially parallel to the main scraper blade for transport, as shown in dotted lines in said figure.

The supplementary scraper blade 16 is mounted as follows:

A longitudinal bar 17 is secured along the upper edge, and on the back side, of the main scraper blade 10 by the cross bolts 14, and an upper, laterally outwardly projecting attachment ear 18 is fixed to the bar 17 and extends some distance beyond the mounting plate 12. A relatively shorter, lower, laterally outwardly projecting ear 19 projects from the mounting plate 12 adjacent its lower edge. An upper, relatively short attachment ear 20 and a lower, relatively long attachment ear 21 are fixed on, and extend inwardly from, the inner end of the supplementary scraper blade 16 in lapping relation to the ears 18 and 19, respectively. Said lapping pairs of ears are pivotally connected together by an upwardly and outwardly canted or inclined pivot pin 22.

With this particular pivotal arrangement the supplementary scraper blade 16, when swung out to a position to overhang and work along the top of the adjacent ditch bank, as in full lines in Fig. 2, is substantially horizontal, but when swung inwardly assumes a position substantially parallel to the main scraper blade 10 for transport.

A power cylinder 23 is pivoted at its inner end, as at 24, to the upper end of the mounting plate 12, and said cylinder 23 includes a piston rod 25 pivoted, as at 26, to the back side of the supplementary scraper blade 16 intermediate its ends.

A rearwardly and outwardly diagonaled, relatively short transfer blade 27 is fixed in connection with the mounting plate 12 at the forward portion of the latter, and said transfer blade 27 overhangs the inner end of the supplementary scraper blade 16 whereby to divert all material flowing upwardly on the main scraper blade 10 onto said supplementary scraper blade 16.

The main frame 1 of the implement is supported, at its rear end, by rear wheels 28, and an operator's seat 29 is disposed at an elevated rear point on the implement.

The power cylinders 7 and 23 are controlled by a valve regulated, fluid pressure system (not shown), which system has its valves adjacent the operator's seat 29 for manipulation.

The above described adjustable wing unit for the main scraper blades 10 of a ditch digging or cleaning implement functions effectively for the leveling and smoothing of the spoil material deposited on top of the adjacent ditch bank from each main scraper blade 10; the working angle of the supplementary scraper blade 16 being under the direct and postive control of the operator, as is movement of said supplementary scraper blade between its working position and its transport position.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a ditcher having an elongated rigid main blade extending at an upward angle to the rear, an adjustable wing attachment for the blade comprising a mounting plate extending lengthwise of and slidably fitted against the main blade adjacent its rear upper end, means to secure the mounting plate at different points along the main blade, a substantially horizontal wing blade mounted on the plate and extending rearwardly and laterally out from the main blade, and a transfer blade rigid with the plate and disposed at a lateral angle to and cooperating with both the main and wing blades and extending from a point on the main blade ahead of the forward end of the wing blade to a rearward termination overlapping the latter.

2. In a ditcher having an elongated rigid main blade extending at an upward angle to the rear and adapted to extend into and engage a side wall of a ditch, an adjustable wing attachment for the blade comprising a mounting plate disposed against the blade adjacent the rear end thereof, a substantially horizontal wing blade mounted on and projecting laterally out from the plate, and means to secure the plate on the main blade at different points along the length of the same and parallel thereto whereby to dispose the wing blade for surface-ground engagement irrespective of the depth of the ditch wall with which the main blade may be engaged.

ERNEST V. BRISCOE.

References Cited in the file of this patent

UNITED STATES PATENTS

| Number | Name | Date |
|---|---|---|
| Re. 20,990 | Wright | Jan. 24, 1939 |
| 1,347,677 | Bressler | July 27, 1920 |
| 1,466,464 | Beatty | Aug. 28, 1923 |
| 1,653,423 | Applegate | Dec. 20, 1927 |
| 1,711,488 | Bising | May 7, 1929 |
| 1,734,279 | Tellis | Nov. 5, 1929 |
| 1,843,260 | Arnold et al. | Feb. 2, 1932 |
| 1,927,078 | Weeks | Sept. 19, 1933 |
| 2,297,938 | Briscoe | Oct. 6, 1942 |
| 2,410,543 | Kester | Nov. 5, 1946 |